United States Patent [19]

Hamilton

[11] Patent Number: 5,392,226
[45] Date of Patent: Feb. 21, 1995

[54] COMPUTER-IMPLEMENTED METHOD AND APPARATUS FOR MONITORING STATISTICAL PROCESS CONTROL DATA

[75] Inventor: Jeffrey L. Hamilton, Cedarburg, Wis.

[73] Assignee: Icom, Inc., West Allis, Wis.

[21] Appl. No.: 78,462

[22] Filed: Jun. 17, 1993

[51] Int. Cl.⁶ .............................................. G05B 17/00
[52] U.S. Cl. ................................ 364/551.01; 364/188; 364/514; 395/118
[58] Field of Search .................... 364/188, 514, 551.01, 364/552; 395/100, 102, 118

[56] References Cited

U.S. PATENT DOCUMENTS

| | | |
|---|---|---|
| 3,725,650 | 4/1973 | Gelder .................................. 364/514 |
| 3,882,305 | 5/1975 | Johnstone . |
| 3,964,026 | 6/1976 | Yamauchi et al. . |
| 4,038,533 | 7/1977 | Dummermuth et al. . |
| 4,227,247 | 10/1980 | Kintner . |
| 4,247,901 | 1/1981 | Martin et al. . |
| 4,513,379 | 4/1985 | Wilson et al. . |
| 4,616,307 | 10/1986 | Kusumi et al. . |
| 4,635,183 | 1/1987 | Isobe et al. . |
| 4,644,478 | 2/1987 | Stephens et al. . |
| 4,661,899 | 4/1987 | Usuda . |
| 4,663,704 | 5/1987 | Jones et al. . |
| 4,718,025 | 1/1988 | Minor et al. . |
| 4,815,014 | 3/1989 | Lipner et al. . |
| 4,833,592 | 5/1989 | Yamanaka . |
| 4,855,897 | 8/1989 | Shinskey . |
| 4,991,076 | 2/1991 | Zifferer et al. . |
| 5,038,318 | 8/1991 | Roseman . |
| 5,053,815 | 10/1991 | Wendell . |
| 5,097,470 | 3/1992 | Gihl . |
| 5,127,099 | 6/1992 | Zifferer et al. . |
| 5,134,574 | 7/1992 | Beaverstock et al. . |
| 5,150,289 | 9/1992 | Badavas . |
| 5,243,511 | 9/1993 | Zifferer et al. . |
| 5,267,145 | 11/1993 | Zifferer et al. . |
| 5,276,811 | 1/1994 | Zifferer et al. . |

OTHER PUBLICATIONS

*MMI Logistics*, Beta–Site Software, Preliminary User's Manual, Mar., 1990 ICOM, Inc.
*PLC-5 Ladder Logistics TM AI Series TM*, Jan. 1989, ICOM, Inc.
*PLC-2 Ladder Logistics User's Manual*, Aug. 1987, ICOM, Inc.
*PLC-5 Ladder Logistics User's Manual*, Sep., 1987, ICOM, Inc.
*Programming and Operations Manual*, Bulletin 1772, Mini PLC-2/05 Processor, 1984, Allen–Bradley Company, Inc.
*Product Bulletin #24*, Apr., 1987, Taylor Industrial Software.

*Primary Examiner*—Emanuel T. Voeltz
*Assistant Examiner*—Edward J. Pipala
*Attorney, Agent, or Firm*—Merchant, Gould, Smith, Edell, Welter & Schmidt

[57] ABSTRACT

A computer-implemented method and apparatus for monitoring a process operating under statistical process control (SPC). The computer displays a "target control chart" to represent SPC data from the process. The target control chart comprises a Specification Limits ball graphically depicting the specifications limits for the process, a Control Limits ball graphically depicting the control limits for the process, and a Data Population ball graphically depicting one or more characteristics of a sample population of the measured data values for the process. Once defined, the Specification Limits ball remains static, and its display is not altered. The Control Limits ball may be static, or may be re-positioned and re-sized as additional measured data values are included in the sample population. The Data Population ball is dynamic and is re-positioned and re-sized as additional measured data values are included in the sample population. The position of the Data Population ball on a Y axis of the target control chart is calculated by averaging all measured data values in a specified study length or moving window of the sample population. The diameter of the Data Population ball is calculated by determining a standard deviation of all measured data values in the specified study length or moving window of the sample population.

28 Claims, 9 Drawing Sheets

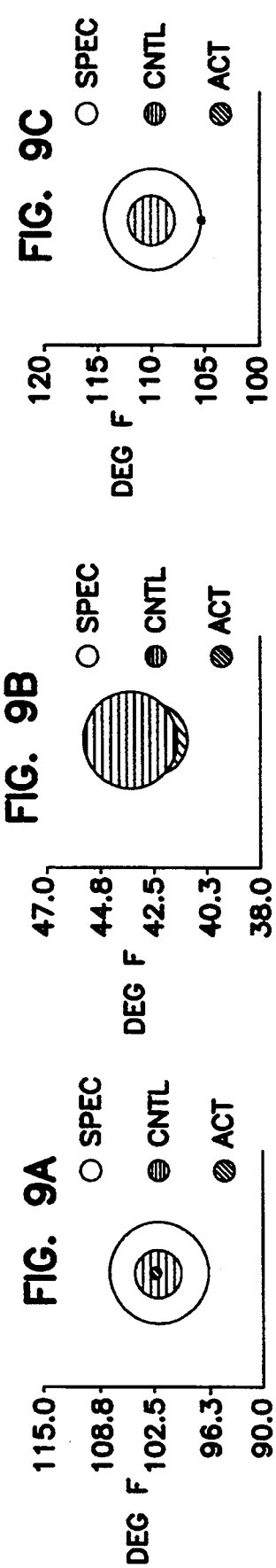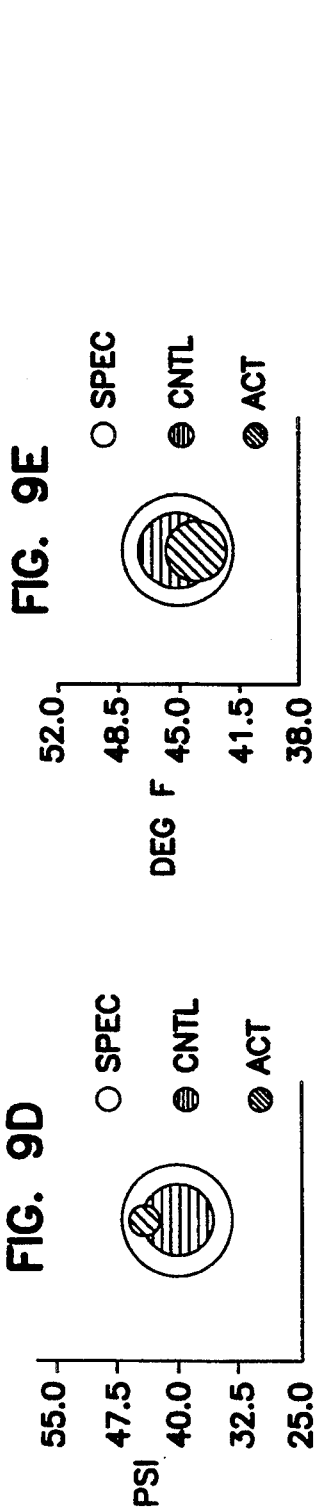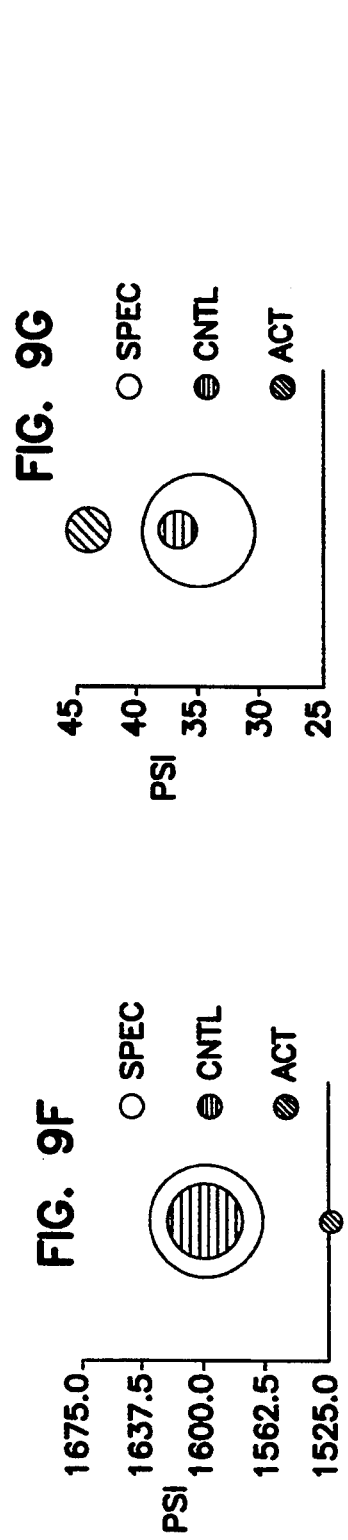

COMPUTER-IMPLEMENTED METHOD AND APPARATUS FOR MONITORING STATISTICAL PROCESS CONTROL DATA

BACKGROUND OF THE INVENTION

1. Field of the Invention

This invention relates in general to computer-implemented monitoring systems, and in particular, to a computer-implemented method and apparatus for graphically monitoring processes operating under statistical process control.

2. Description of Related Art

The technique of statistical process control (SPC) optimizes an industrial process by monitoring one or more characteristics of the process over time. SPC relies on a statistical analysis of process variables to ensure that the process is operating in a desired matter. SPC is based on the assumption that there is a random variation in the values of each variable that serves as a measure of the quality or efficiency of the process. To ensure that the process is in control, the values are measured at discrete intervals during the operation of the process. If the values consistently exhibit a normal distribution pattern within established limits, then the process is in statistical control. Variation from this normal distribution indicates that the process is not in statistical control. By plotting the values and comparing them with a desired target level, it is possible to detect undesirable shifts in the process. Once alerted, the operator can then take compensating steps to bring the process back under control.

SUMMARY OF THE INVENTION

The present invention discloses a computer-implemented method and apparatus for monitoring processes operating under statistical process control. Data values are collected from the processes, representing such events as state changes, flows, tank levels, etc., and are communicated to a computer for interpretation and display. The data values are then stored in a memory of the computer, and are used to determine how a target control chart is displayed on a monitor. The target control chart comprises a Specification Limits ball graphically depicting the specifications limits for the process, a Control Limits ball graphically depicting the control limits for the process, and a Data Population ball graphically depicting one or more characteristics of a sample population of the measured data values for the process. Once defined, the Specification Limits ball remains static, the Control Limits ball may be static or dynamic, and the Data Population ball is dynamic. The Data population and (optionally) the Control Limits balls may be re-positioned and re-sized as additional measured data values are included in the sample population.

BRIEF DESCRIPTION OF THE DRAWINGS

Referring now to the drawings in which like reference numbers represent like elements throughout the several views:

FIGS. 9A-9G are example target control charts illustrating some of the variety of different ways that a target control chart could appear to represent SPC data.

DETAILED DESCRIPTION OF THE PREFERRED EMBODIMENT

In the following description of the preferred embodiment, reference is made to the accompanying drawings which form a part hereof, and in which is shown by way illustration a specific embodiment in which the invention may be practiced. It is to be understood that other embodiments may be utilized and structural changes may be made without departing from the scope of the present invention.

OVERVIEW

The present invention provides a computer-implemented method and apparatus for monitoring processes operating under statistical process control (SPC). Data is collected representing process events, such as state changes, flows, tank levels, etc., and is communicated to the computer for interpretation and display. The present invention displays SPC data as "target control charts" to increase operator comprehension.

Target control charts are a merger of two classic methods of measure, i.e., a "target" metaphor as is typically used to measure accuracy in sports like archery, and a "carpenter's level" metaphor as is typically used to measure the deviation of a surface from an established plane. However, in the present invention, target control charts provide a measure of SPC data.

Figure 1:
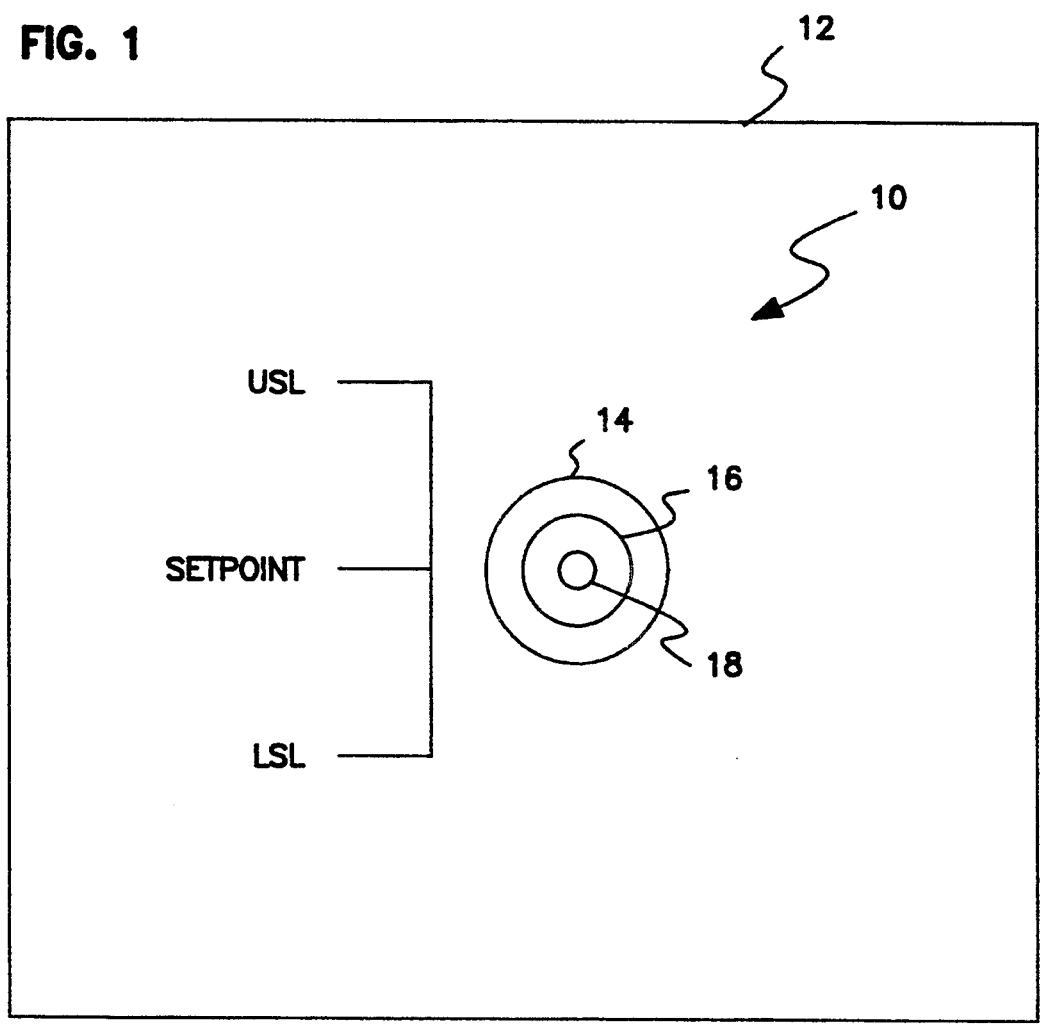
FIG. 1 illustrates a typical target control chart displayed on a computer monitor according to the present invention.

FIG. 1 illustrates a typical target control chart 10 displayed on a computer monitor 12 according to the present invention. The SPC data displayed on the target control chart 10 is depicted as three concentric and differently sized (and preferably differently colored) circles or balls 14, 16 and 18. The outer ball 14 represents Specification Limits; the middle ball 16 represents Control Limits; and the inner ball 18 represents a Data Population. The ideal state for a target control chart 10 is when the balls 14, 16 and 18 are aligned and sized with the appearance of an archery target, such as the example shown in FIG. 1. During active monitoring, the Specification Limits ball 14 is static, the Control Limits ball 16 may be either static or dynamic, and the Data Population ball 18 is dynamic.

The Specification Limits ball 14 defines a maximum allowed range of values for the data being sampled, and is centered at a Setpoint defining an ideal value for the data being sampled. The diameter and position of the Specification Limits ball 14 are defined by the operator and are not altered during the monitoring process.

The Control Limits ball 16 defines an ideal operating range of values for the data being sampled, and thus defines a narrower range that typically (although not always) falls within the Specification Limits. The diameter and position of the Control Limits ball 16 may be defined by the operator, in which case it is not altered during the monitoring process. Alternatively, the diameter and position of the Control Limits ball 16 may be a function of the data values sampled from the process being monitored, and therefore could change in response to a change in the data values. In the preferred embodiment, the diameter of a dynamic Control Limits ball 16 is determined by the standard deviation of all values in a study length or moving window of the sample population, and the position of the dynamic Control Limits ball 16 is centered within that range. Of course, those skilled in the art will recognize that other methods could be substituted for the specific calculations noted above. Indeed, the calculation of the diameter and position of the Control Limits ball is intended to be programmable and thus user-definable.

The Data Population ball 18 illustrates the data values being sampled from the process, and thus its diameter and position change dynamically in response to such data values. In the preferred embodiment, the position of the Data Population ball on the Y axis is determined by the process average, i.e., the average of all values in a study length or moving window of the sample population, or the range (R) of a subgroup. In the preferred embodiment, the diameter of the Data Population ball is determined by the standard deviation of all values in the study length or moving window of the sample population. Of course, those skilled in the art will recognize that other methods could be substituted for the specific calculation noted above. Indeed, the calculation of the position and diameter of the Data Population ball is intended to be programmable and thus user-definable.

If the size of the Data Population ball is less than the Control Limits, and the process average is near the Setpoint (or alternatively the center between Specification Limits if no Setpoint is specified), then the chart will look like an "archery target" and the process will be "on target".

HARDWARE

Figure 2:
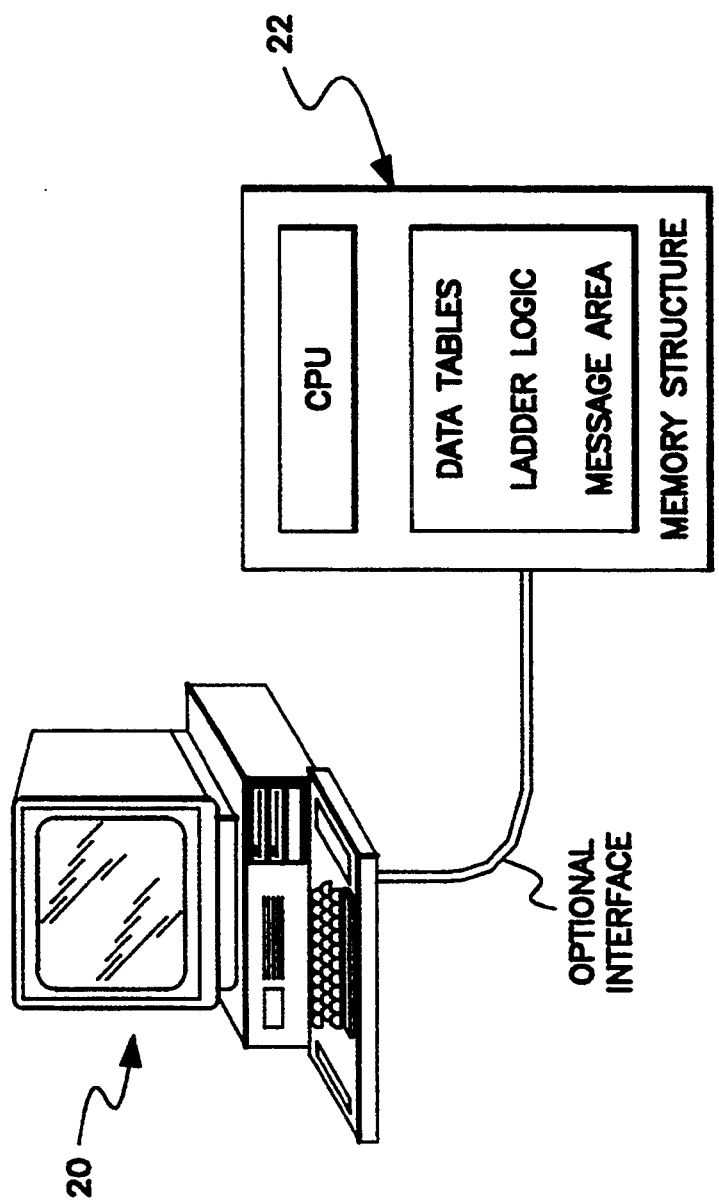
FIG. 2 illustrates a hardware environment of the type typically used with the present invention.

FIG. 2 illustrates a hardware environment of the type typically used with the present invention. Those skilled in the art will recognize that the present invention has applications in other environments as well. Indeed, the present invention can be used to monitor any process which is susceptible to statistical process control.

In one exemplary embodiment, a personal computer 20 collects SPC data from a data source 22. The data source could comprise, for example, a programmable logic controller (PLC) that performs control functions for assembly line machines, machine tools, and other types of industrial equipment. Alternatively, the data source 22 could be a spreadsheet or monitoring program being executed by the computer 20, or some other apparatus that monitors any process and generates statistical process control data for the process.

Data can be transferred between the computer 20 and data source 22. Typically, data transfers between the computer 20 and data source 22 occur at programmed intervals or upon the occurrence of a recognized event. For example, queries can be formatted on the computer 20 and transmitted to the data source 22, which then responds by transmitting the desired data to the computer. In addition, the data source 22 can transmit data to the computer 20 in response to the triggering of an event in the data source 22.

SOFTWARE

Figure 3:
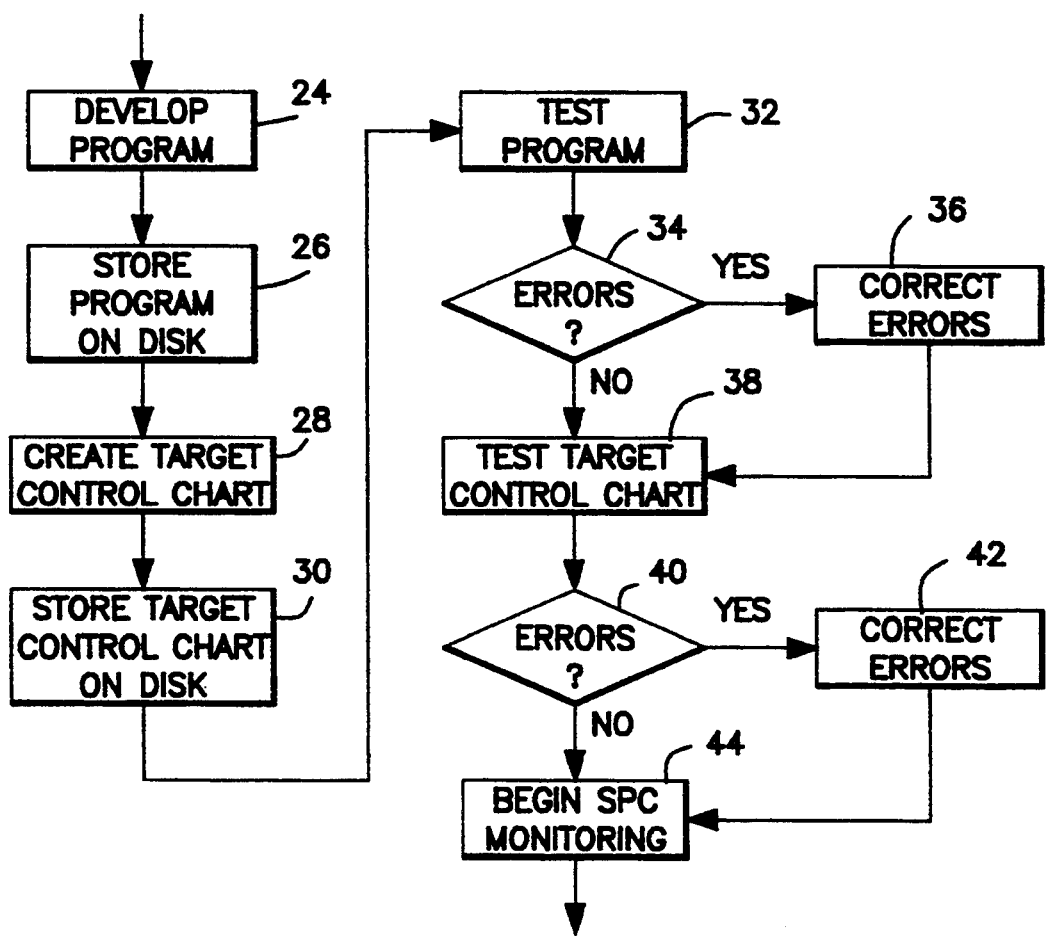
FIG. 3 is a flowchart illustrating a typical development and test cycle in the preferred embodiment.

FIG. 3 is a flowchart illustrating a typical development and test cycle in the preferred embodiment. Block 24 represents the user developing a program for the data source 22 on a personal computer 20, wherein the program controls and/or monitors the operation of a process. Block 26 represents the user storing the program in a disk file on the computer 20. Block 28 represents the user creating a target control chart on the computer 20, including the steps of "tying" or associating the target control chart to a data element in the data source 22 and specifying the performance parameters for the data element. Finally, block 30 represents the user storing the target control chart setup data in a disk file on the computer 20.

Block 32 represents the user testing the program for the data source 22. Block 34 is a decision block that determines whether there are any errors in the program and block 36 represents the correction of the errors. Block 38 represents the user testing the target control chart. Block 40 is a decision block that determines whether there are any errors in the target control chart and block 42 represents the correction of the errors. Usually these steps are sufficient to resolve any errors. Once the errors are resolved, block 44 represents the monitoring of SPC data.

CREATING TARGET CONTROL CHARTS

Figure 4:
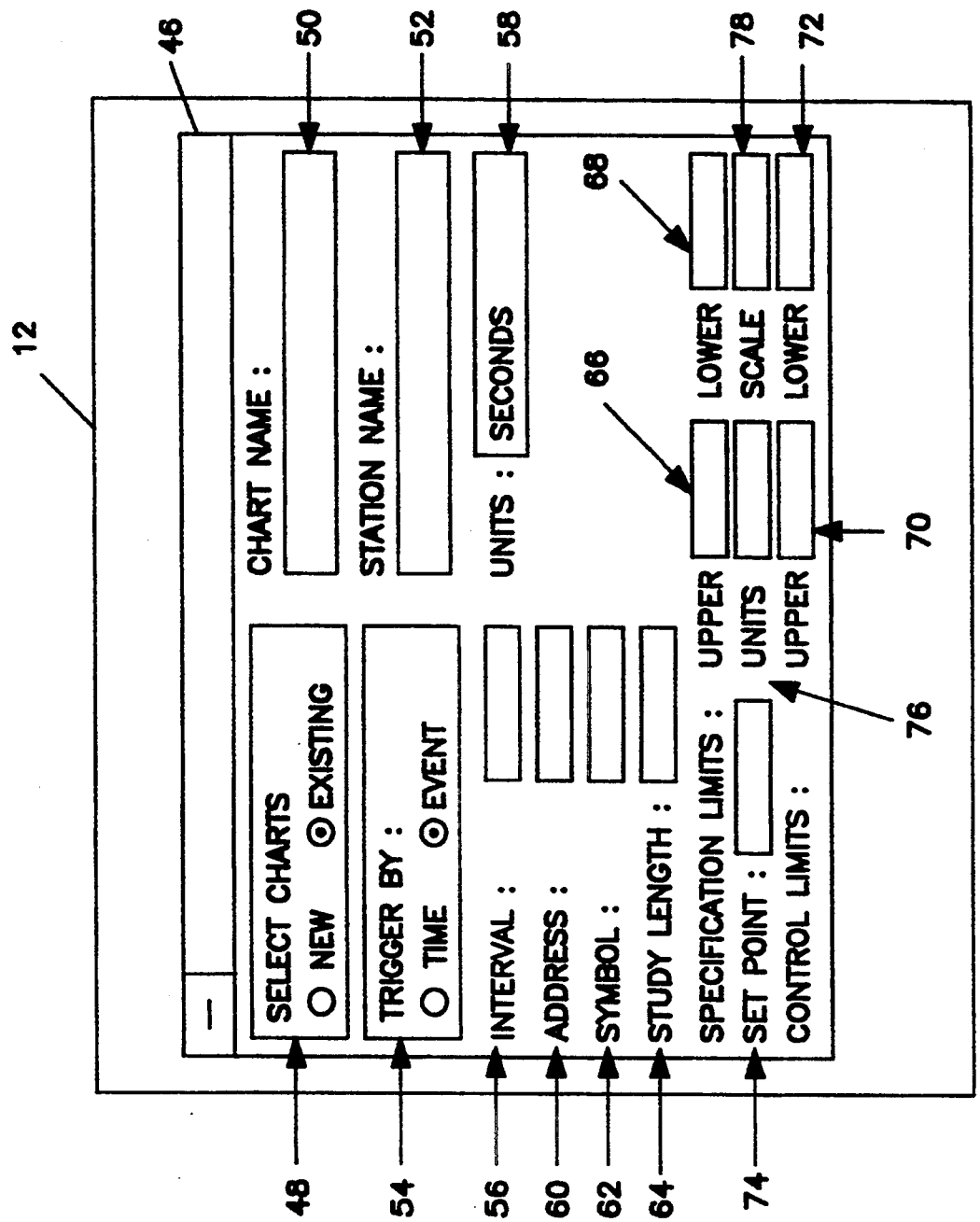
FIG. 4 represents a "Define Charts" dialogue box 44 that is displayed by the computer at block 28 of FIG. 3.

FIG. 4 represents a "Define Charts" dialogue box 44 that is displayed by the computer 20 at block 28 of FIG. 3. Those skilled in the art will recognize that modifications may be made to the dialogue box 46 without departing from the scope of the present invention.

By selecting among the choices in selection box 48, the user may define a new target control chart or select from a list (not shown) of previously defined target control charts. If a new target control chart is created, the operator enters a chart name into field 50. Alternatively, if a previously defined target control chart is selected, the computer 20 displays the chart name in the field 50. Additionally, the operator may identify the data source 22 in field 52.

By selecting item 54, the user defines whether the sampling of data occurs on a time interval or by event. If the "Time" field is selected, the operator enters a sampling period (by specifying the count and units) into fields 56 and 58 that indicates how often the computer 20 is to poll the data source 22 for data. Alternatively, if the "Event" field is selected, the program executing in the data source 22 must have been programmed to supply data to the computer 20 at some defined event, and thus the computer 20 is merely a passive receptor of data from the data source 22.

Fields 60 and 62 allow the user to define a data element to be sampled, either by entering the data element address in field 60, or by entering a symbol name representing the data element address in field 62. Functionality exists so that the user can select the symbol name from a list (not shown) of previously defined symbols stored on the computer 20.

Field 64 allows the user to define the number of most recent samples to include in the calculations for the target control charts. These samples define a "study length" or "moving window" of the sample population as described in more detail below in FIG. 7.

Fields 66–70 allow the user to define the various parameters for the target control chart. Mandatory performance parameters comprise an Upper Specification Limit (USL) 66 and a Lower Specification Limit (LSL) 68; optional performance parameters comprise an Upper Control Limit (UCL) 70, Lower Control Limit (LCL) 72, and Setpoint 74; and display parameters comprise a Y axis scale 76 and Y axis units 78. The Upper and Lower Specification Limits 66 and 68 define a maximum allowed range of values for the data being sampled. The Upper and Lower Control Limits 70 and 72 define an ideal operating range of values for the data being sampled, and if not specified by the operator, are derived from the standard deviation of the data values being sampled. The Setpoint 74 defines an ideal value for the data being sampled, and if not specified by the operator, is defined as the center between the Upper and Lower Specification Limits 66 and 68. The scale and units parameters 76 and 78 define the Y axis of the target control charts.

EXECUTING TARGET CONTROL CHARTS

Figure 5:
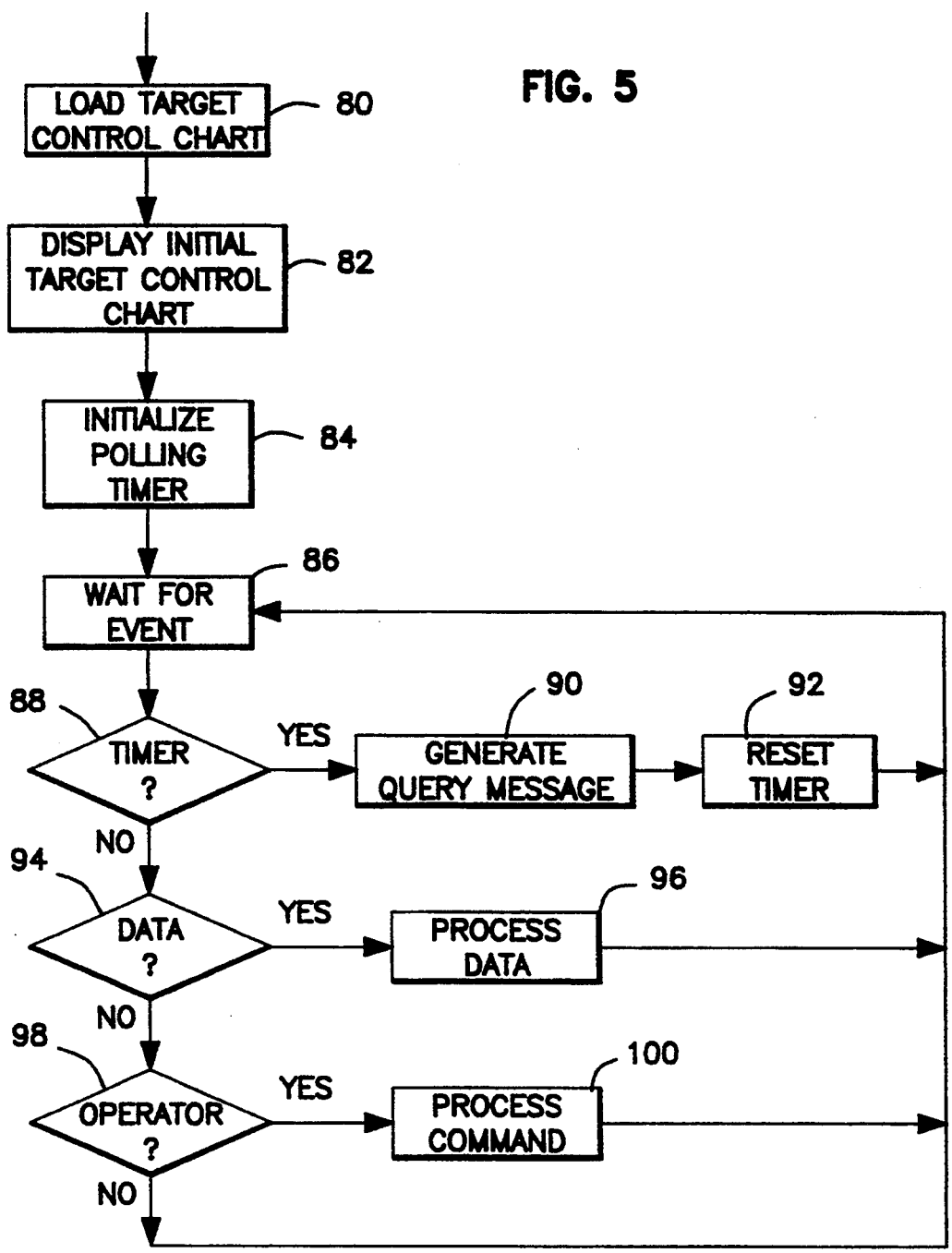
FIG. 5 is a flowchart illustrating the steps performed by the computer in executing a target control chart after all the required parameters have been set in the "Define Charts" dialogue box of FIG. 4.

FIG. 5 is a flowchart illustrating the steps performed by the computer 20 in executing a target control chart after all the parameters have been set in the "Define Charts" dialogue box described in FIG. 4.

Block 80 represents the loading of the target control chart by the computer 20, and block 82 represents the display of an initial target control chart by the computer 20. Block 84 represents the initialization of a polling interval timer for the data source 22, if one is required. Block 86 represents a loop, whereby the computer 20 waits for an event to occur. The computer 20 may handle a number of different events: the triggering of a polling interval (blocks 88–92); the receipt of data from the data source 22 (blocks 94–96); or the entry of commands by the operator (blocks 98–100).

When a polling interval is triggered as determined at decision block 88, block 90 generates a query message requesting a particular element value from the data source 22. Block 92 represents the resetting of the polling interval, and control then returns to block 86.

When data is received from the data source 22 as determined at decision block 94, either in response to a prior query message transmitted by the computer 20 or as an unsolicited message generated by the data source 22, block 96 processes the data, as described in more detail below in FIG. 6, and control then returns to block 86.

When a command is entered by the operator as determined at decision block 98, block 100 processes the command, and control then returns to block 86.

THE INITIAL DISPLAY OF A TARGET CONTROL CHART

Figure 6:
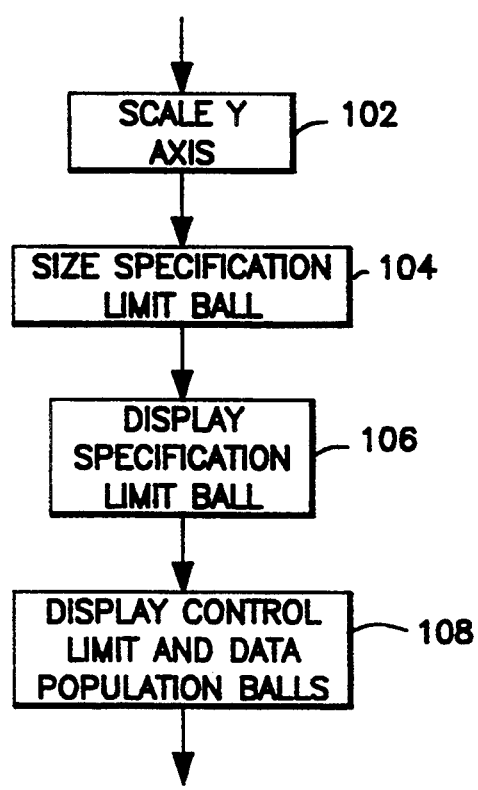
FIG. 6 is a flowchart illustrating the steps performed by the computer in initially displaying a target control chart at block 74 in FIG. 5.

FIG. 6 is a flowchart illustrating the steps performed by the computer 20 in initially displaying a target control chart at block 74 in FIG. 5.

Block 102 represents the scaling of the Y axis for the target control chart to reflect a "viewport" determined by the Upper Specification Limit and Lower Specification Limit, wherein the scaling maximizes the resolution of the data being viewed. Block 104 represents the sizing of the Specification Limits ball to reflect a scaled Specification Limits range, i.e., (USL - LSL) multiplied by a scaling factor. Block 106 represents the display of the Specification Limits ball with the center of the ball positioned at the Setpoint on the Y axis, or at the middle point of the Y axis if no Setpoint is specified. The scaling factor is used so that the Specification Limits ball does not fill the entire Y axis. This allows the Specification Limits ball to "float" on the Y-axis to accurately represent the position of a Setpoint.

Block 108 represents the display of the Control Limits and Data Population balls relative to the Specification Limits ball. The diameter of the Control Limits ball is displayed as specified and the center of the Control Limits ball is positioned at UCL-((UCL-LCL)/2). Similarly, at initialization and before any data values are sampled, the Data Population ball is displayed as a point on the target control chart centered at the middle point of the Y axis.

PROCESSING DATA FOR TARGET CONTROL CHARTS

Figure 7:
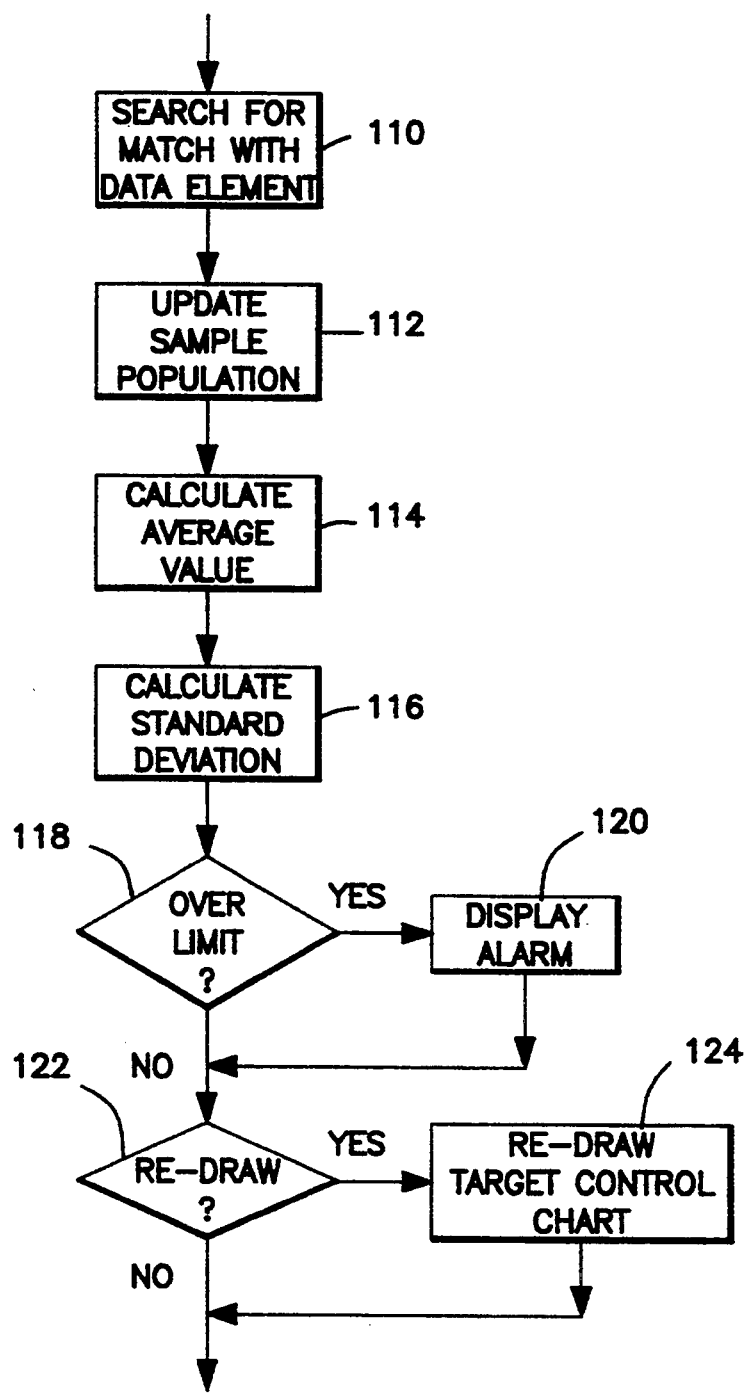
FIG. 7 is a flowchart illustrating the steps performed by the computer in processing data at block 96 of FIG. 5.

FIG. 7 is a flowchart illustrating the steps performed by the computer 20 in processing data at block 96 of FIG. 5. The data received by the computer 20 from the data source 22 typically comprises a data element identifier and its current value, although other formats could be used. Block 110 represents the computer 20 searching the "Define Charts" data structures described in FIG. 4 to match the data element identifier to one or more target control charts. Once matching target control charts are found, blocks 112–124 represent the computer 20 processing the current value of the data element for the target control chart: (1) block 112 represents the updating of the sample population by storing the current value of the data element with previously stored values; (2) block 114 represents the calculation of an average of the values over a specified study length or moving window of the sample population; (3) block 116 represents the calculation of a standard deviation of the values over the study length or moving window; and (4) blocks 118 and 120 represent the triggering of an alarm on the computer 20, if any of the specified Specification or Control Limits have been exceeded. Thereafter, blocks 122 and 124 represent the redrawing of the target control chart, if the current value causes it to be altered.

Those skilled in the art will recognize that other calculations could be substituted for the example calculations noted above. The methods used in processing of data for the target control charts are intended to be programmable and thus user-definable.

ALTERING THE DISPLAY OF A TARGET CONTROL CHART

Figure 8:
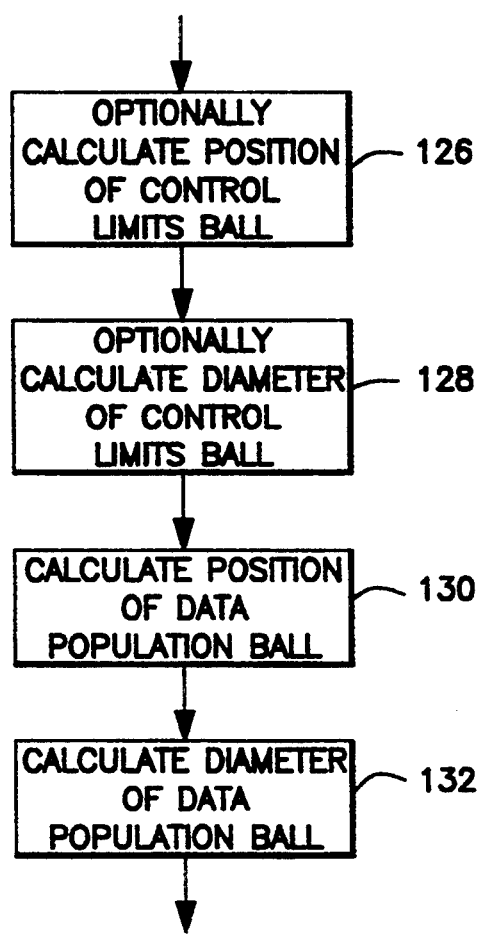
FIG. 8 is a flowchart illustrating the steps performed by the computer in altering the display or redrawing the target control chart at block 106 in FIG. 7.

FIG. 8 is a flowchart illustrating the steps performed by the computer 20 in altering the display or redrawing the target control chart at block 124 in FIG. 7. Those skilled in the art will recognize that other calculations could be substituted for the specific calculations noted below. Moreover, these calculations are intended to be programmable and thus user-definable.

Block 126 represents the (optional) calculation of the diameter of the Control Limits ball, when it is dynamic and has not been specified by the operator. In the preferred embodiment, the diameter of the Control Limits ball in such a case is six times the standard deviation of all values in the study length or moving window of the sample population, multiplied by the scaling factor.

Block 128 represents the (optional) calculation of the position of the Control Limits ball on the Y axis, which in the preferred embodiment is at a point of the Y axis equal to the process mean or three times the standard deviation added to the LCL. As a result, the data values may skew the size and position of the dynamic Control Limits ball, so that it will not necessarily be centered within the Specification Limits ball.

Block 130 represents the calculation of the position of the Data Population ball on the Y axis, which in the preferred embodiment is determined by the process average, i.e., the average of all values in the study length or moving window of the sample population.

Block 132 represents the calculation of the diameter of the Data Population ball, which in the preferred embodiment is six times the standard deviation of all values in the study length or moving window of the sample population, multiplied by the scaling factor.

The data represented on a target control chart is "population based," which has several implications that should be understood when viewing a target control chart. For example, changing the size and position of the Data Population ball becomes more difficult as more data is collected, because the effect an individual value has on the entire sample population decreases as the number of values increase. Moreover, the diameter of the Data Population ball is based on the standard deviation of all values in the study length or moving window of the sample population, and preferably at least 10 values are required before the accuracy of the prediction for the sample population is statistically acceptable.

If the size of the Data Population ball is less than the Control Limits, and the process average is near the Setpoint (or alternatively the center between Specification Limits if no Setpoint is specified), then the chart will look like an "archery target" and the process will be "on target". Note that the size of the Data Population ball is scaled relative to the size of the Specification Limits ball. Thus, during viewing, a mental calibration of sorts can be performed by knowing that the diameter of the balls are scaled according to the range of the Y axis.

Target control charts should be monitored for vertical movement of the Data Population ball as well as any change in the diameter of the Data Population ball. Changes in the vertical position of the Data Population ball are related to the process average and indicate a change in the "aim" of the process. Changes in the diameter of the Data Population ball are related to the "ranges" of the data values and indicate a change in the unit-to-unit or "spread" variation of the process.

Considering the above factors, it may be possible to correct or reverse the growth of the Data Population ball before any product is actually produced. However, position changes of the Data Population ball mean that products have already been produced with the indicated process aim.

TARGET CONTROL CHART EXAMPLES

FIGS. 9A-9G are example target control charts illustrating some of the variety of different ways that a target control chart could appear to represent SPC data.

FIG. 9A illustrates a target control chart "PID2" that is "on target" with the process average at the Setpoint and the Data Population smaller than the Control Limits, which are, in turn, less than 75% of the Specification Limits.

FIG. 9B illustrates a target control chart "WATER TEMP" that has a Data Population that is very close to using the entire Specification Limits range and is definitely "out of control" because the Data Population ball exceeds the Control Limits.

FIG. 9C illustrates a target control chart "PID3" that is very capable, but the "aim" is off to the low side. To have a Data Population in this state, numerous "trend alarms" would be generated indicating the process has "drifted" from the Setpoint.

FIG. 9D illustrates a target control chart "WATER PRESSURE2" that is running quite good, and would pose no problems if left unattended. A small adjustment to the "aim" could improve the overall process.

FIG. 9E illustrates a target control chart "WATER TEMP3" that appears much like many actual variables would appear. The Data Population has slightly exceeded the Lower Control Limit, which is what could be expected with an operator "tuning" the process.

FIG. 9F illustrates a target control chart "PRESSURE3" that has gone "out of specification," wherein the process average is less than the Lower Specification Limit, as can be seen by the location of the Data Population ball. The overall process capability is, however, very good as indicated by the size of Data Population ball as compared to the Specification Limits ball. By adjusting the aim, this variable could be "on target".

FIG. 9G illustrates a target control chart "WATER PRESSURE3" that is an example of a process that is "out of control" in both aim and normal process variation, wherein the process average is greater than the Upper Control Limit and the Data Population ball exceeds the Upper Control Limit. The process is "capable" and within the Specification Limits. The Control Limits, if derived from a capability study, indicate that the process is "capable" of running much better and would indicate a machine in need of repairs or maintenance.

SUMMARY

In summary, a computer-implemented method and apparatus for graphically monitoring statistical process control data has been disclosed. Data values collected from the processes, representing such events as state changes, flows, tank levels, etc., are communicated to a computer for interpretation and display. Target control charts are used to graphically depict the data values on a monitor. The target control chart comprises a Specification Limits ball graphically depicting the specifications limits for the process, a Control Limits ball graphically depicting the control limits for the process, and a Data Population ball graphically depicting one or more characteristics of a sample population of the measured data values for the process. Once defined, the Specification Limits ball remains static, the Control Limits ball may be static or dynamic, and the Data Population ball is dynamic. Dynamic changes to the Control Limits and Data Population balls occur as additional measured data values are included in the sample population.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A process monitoring apparatus, comprising:
   (a) means for collecting measured data values representing one or more characteristics of a process at discrete intervals during its operation;
   (b) means for storing the measured data values in a memory; and
   (c) means for displaying a target control chart on a monitor, wherein the target control chart comprises a Specification Limits ball graphically depicting specification limits for the process, a Control Limits ball graphically depicting control limits for the process, and a Data Population ball graphically depicting one or more characteristics of a sample comprising at least one of the and wherein the Specification Limits ball, the Control Limits ball and the Data Population ball are displayed on the monitor in a manner to represent an interrelation between the specification limits for the process, the control limits for the process, and the characteristics of the sample, so that an ideal environment is represented by concentrically overlaying the Specification Limits ball, Control Limits ball and Data Population ball.

2. The apparatus as set forth in claim 1 above, wherein the means for displaying further comprises means for re-positioning and re-sizing the Data Population ball and Control Limits ball as additional measured data values are included in the sample.

3. The apparatus as set forth in claim 1 above, further comprises:
   (1) means for updating the sample with additional measured data values;
   (2) means for calculating an average of one or more of the measured data values in the sample;
   (3) means for calculating a standard deviation of one or more of the measured data values in the sample; and
   (4) means for re-drawing the target control chart when the additional measured data values cause the Data Population ball to be altered.

4. The apparatus as set forth in claim 3 above, wherein the means for re-drawing comprises:
   (i) means for calculating a position of the Data Population ball on a Y axis of the target control chart by averaging one or more of the measured data values in the sample; and
   (ii) means for calculating a size of the Data Population ball by determining a standard deviation of one or more of the measured data values in the sample.

5. The apparatus as set forth in claim 3 above, wherein the means for re-drawing comprises:
   (i) means for calculating a size of the Control Limits ball by determining a standard deviation of one or more of the measured data values in the sample; and
   (ii) means for calculating a position of the Control Limits ball on a Y axis of the target control chart using the standard deviation.

6. The apparatus as set forth in claim 3 above, further comprising means for triggering an alarm on the computer when the measured data values exceed the specified specification or control limits.

7. The apparatus as set forth in claim 1 above, wherein the means for collecting comprises means for sampling the data values at a specified time interval.

8. The apparatus as set forth in claim 1 above, wherein the means for collecting comprises means for sampling the data values at an occurrence of a specified event.

9. The apparatus as set forth in claim 1 above, further comprising means for defining how many measured data values to include in the sample.

10. The apparatus as set forth in claim 1 above, wherein the means for displaying further comprises means for scaling a Y axis for the target control chart to reflect a viewport determined by the specification limits, wherein the scaled Y axis maximizes the resolution of the measured data values being viewed.

11. The apparatus as set forth in claim 1 above, wherein the means for displaying further comprises means for sizing the Specification Limit ball.

12. The apparatus as set forth in claim 1 above, wherein the means for displaying further comprises means for displaying the Specification Limit ball with its center positioned at a Setpoint on a Y axis of the target control chart.

13. The apparatus as set forth in claim 1 above, wherein the means for displaying further comprises means for displaying the Specification Limit ball with its center positioned at a center of a Y axis of the target control chart when no Setpoint is specified.

14. The apparatus as set forth in claim 1 above, wherein the means for displaying further comprises means for displaying the Control Limit and Data Population balls at a scale relative to the Specification Limit ball.

15. A method for monitoring a process, comprising:
   (a) collecting measured data values representing one or more characteristics of a process at discrete intervals during its operation;
   (b) storing the measured data values in a memory; and
   (c) displaying a target control chart on a monitor attached to a computer, wherein the target control chart comprises a Specification Limits ball graphically depicting specification limits for the process, a Control Limits ball graphically depicting control limits for the process, and a Data Population ball graphically depicting one or more characteristics of a sample of at least one of the measured data values, and wherein the Specification Limits ball, the Control Limits ball and the Data Population ball are displayed on the monitor in a manner to represent an interrelation between the specification limits for the process, the control limits for the process, and the characteristics of the sample, so that an ideal environment is represented by concentrically overlaying the Specification Limits ball, Control Limits ball and Data Population ball.

16. The method as set forth in claim 15 above, wherein the displaying further comprises the step of re-positioning and re-sizing the Data Population ball and Control Limits ball as additional measured data values are included in the sample.

17. The method as set forth in claim 15 above, further comprising the steps of:
   (1) updating the sample with additional measured data values;
   (2) calculating an average of one or more of the measured data values in the sample;
   (3) calculating a standard deviation of one or more of the measured data values in the sample; and
   (5) re-drawing the target control chart when the additional measured data values cause the Data Population ball to be altered.

18. The method as set forth in claim 17 above, wherein the re-drawing step comprises the steps of:
   (i) calculating a position of the Data Population ball on a Y axis of the target control chart by averaging one or more of the measured data values in the sample; and
   (ii) calculating a size of the Data Population ball by determining a standard deviation of one or more of the measured data values in the sample.

19. The method as set forth in claim 17 above, wherein the re-drawing step comprises the steps of:
   (i) calculating a size of the Control Limits ball by determining a standard deviation of one or more of the measured data values in the sample; and
   (ii) calculating a position of the Control Limits ball on a Y axis of the target control chart using the standard deviation.

20. The method as set forth in claim 17 above, further comprising the step of triggering an alarm on the computer when the measured data values exceed the specified specification or control limits.

21. The method as set forth in claim 15 above, wherein the collecting step comprises the step of sampling the data values at a specified time interval.

22. The method as set forth in claim 15 above, wherein the collecting step comprises the step of sampling the data values at an occurrence of a specified event.

23. The method as set forth in claim 15 above, further comprising the step of defining how many measured data values to include in the sample.

24. The method as set forth in claim 15 above, wherein the displaying step further comprises the step of scaling a Y axis for the target control chart to reflect a viewport determined by the specification limits, wherein the scaled Y axis maximizes the resolution of the measured data values being viewed.

25. The method as set forth in claim 15 above, wherein the displaying step further comprises the step of sizing the Specification Limit ball.

26. The method as set forth in claim 15 above, wherein the displaying step further comprises the step of displaying the Specification Limit ball with its center positioned at a Setpoint on a Y axis of the target control chart.

27. The method as set forth in claim 15 above, wherein the displaying step further comprises the step of displaying the Specification Limit ball with its center positioned at a center of a Y axis of the target control chart when no Setpoint is specified.

28. The method as set forth in claim 15 above, wherein the displaying step further comprises the step of displaying the Control Limit and Data Population balls at a scale relative to the Specification Limit ball.

* * * * *

UNITED STATES PATENT AND TRADEMARK OFFICE
CERTIFICATE OF CORRECTION

PATENT NO. : 5,392,226

DATED : February 21, 1995

INVENTOR(S) : Jeffrey L. Hamilton

It is certified that error appears in the above-identified patent and that said Letters Patent is hereby corrected as shown below:

In column 9, line 15, please insert --measured data values,-- after the word "the".

In column 9, line 31, "comprises" should read --comprising--.

Signed and Sealed this

First Day of August, 1995

Attest:

BRUCE LEHMAN

Attesting Officer        Commissioner of Patents and Trademarks